United States Patent [19]

Bröggelwirth

[11] Patent Number: 5,065,288

[45] Date of Patent: Nov. 12, 1991

[54] DIMMABLE HEADLIGHT

[75] Inventor: Hartmut Bröggelwirth, Lippstadt, Fed. Rep. of Germany

[73] Assignee: Hella KG Hueck & Co., Fed. Rep. of Germany

[21] Appl. No.: 627,215

[22] Filed: Dec. 13, 1990

[30] Foreign Application Priority Data

Dec. 16, 1989 [DE] Fed. Rep. of Germany ....... 3941615

[51] Int. Cl.[5] ............................................. B60Q 1/00

[52] U.S. Cl. ...................................... 362/61; 362/309; 362/332; 362/337

[58] Field of Search .................. 362/61, 80, 332, 335, 362/336, 337, 338, 339, 340, 328, 329, 308, 309

[56] References Cited

U.S. PATENT DOCUMENTS

| | | | |
|---|---|---|---|
| 1,302,148 | 4/1919 | Ford | 362/339 |
| 1,788,936 | 1/1931 | Wood | 362/336 |
| 2,782,297 | 2/1957 | Geissbruhler et al. | 362/336 |
| 4,142,229 | 2/1979 | Hulbert, Jr. | 362/338 |
| 4,272,801 | 6/1981 | Fratty | 362/61 |
| 4,276,584 | 6/1981 | Ichikawa | 362/308 |
| 4,305,119 | 12/1981 | Draper et al. | 362/332 |
| 4,607,318 | 8/1986 | Lindae et al. | 362/309 |
| 4,608,623 | 8/1986 | Stephano | 362/80 |
| 4,701,834 | 10/1987 | Glaser et al. | 362/309 |
| 4,916,585 | 4/1990 | Nino | 362/61 |

FOREIGN PATENT DOCUMENTS

3417034Al 11/1985 Fed. Rep. of Germany .

*Primary Examiner*—Ira J. Lazarus
*Assistant Examiner*—Sue Hagerman
*Attorney, Agent, or Firm*—Griffin Branigan & Butler

[57] ABSTRACT

A headlight has a parabolic shaped reflector (8) with an incandescent lamp whose filament (13) is defocussed, or approximately at a focus point for distribution, by the reflector. A light-transmissive shield (4) has upper and lower zones (1 and 2) with prism-like optical devices (5 and 6) thereon which are respectively positioned above and below a horizontal middle plane of the reflector. Both zones are bordered by a vertical middle plane of the headlight. The upper zone extends to an oncoming traffic side while the lower zone extends to the other side and its upper edge is approximately bordered by the horizontal middle portion of the reflector. In this connection, the prism-like optical devices are arranged so that light beams passing therethrough are diverted to a partial area (100, 200) of a light figure of the headlight which, on a driving side, is at a higher level than on the oncoming traffic side.

17 Claims, 5 Drawing Sheets

DIMMABLE HEADLIGHT

BACKGROUND OF THE INVENTION

This invention relates generally to dimmable headlights having light-transmissive shields for creating light figures having at least central portions lying generally below horizontal middle planes and displaced from sides of vertical planes facing away from oncoming traffic.

Such a dimmable headlight is disclosed in german offenlegungsschrift 34 17 034. A light-transmissive shield is divided into multi surface zones which are occupied by overlying prisms and lenses. Four such surface zones divert light in a partial area of a light figure reaching a higher-level portion of a bright-dark border. A plurality of other surface zones divert light below a portion of the bright-dark border extending at a lower level. In this manner, the light figure is a composite of complete or partial overlapping partial areas. Since the light-transmissive shield has many surface zones with various overlying optical devices, such as for example, prisms and lens, with many optical devices of various forms and sizes, it is quite difficult and time intensive to develop and produce such optical devices.

Further, there is another prior-art headlight, of which FIG. 1 is a front view, looking into a reflector 8' thereof, and FIG. 2 is a graphical view of filament images 12' produced thereby. The filament images 12' lie in a partial area 100' of a light figure, which reaches a higher-level portion of a light-dark border. The filament images 12' are created by light rays, or beams, which are reflected from those areas provided with crosses 10'. In this regard, those positions provided with crosses 10' are spread approximately evenly over a reflection surface of the reflector 8' and thereby optical devices for light beams reflected from these positions 10' must be arranged so that the partial figure 100' is created. The light-transmissive shield (not shown in the drawings) of this headlight has a plurality of surface zones with various types of optical devices. Because of this, length axes of the filament images 12' in the partial area 100' do not extend in an orderly manner relative to one another.

It is an object of this invention to provide a dimmable headlight of a type defined in the first paragraph of claim 1 hereof which distributes light according to legal requirements (for example U.S.A. requirements) with a reduction in the number of surface zones of a light-transmissive shield occupied by various types of optical devices as well as overlapping optical devices, in particularly, however, in the number of those surface zones of the light-transmissive shield through which light beams falling on a partial area of a light figure pass which extends to a higher-level portion of a bright-dark border.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRED EMBODIMENT

A light reflective, or exit, surface of the reflector 8 is covered by a light-transmissive shield 4. An axis of an elongated glow filament 13 extends square, or perpendicular, to an optical axis approximately through a focal point of the parabolic reflector 8 so that light bundled by the reflector 8 (without diversion by optical devices) strikes a vertical wall placed in front of the reflector mostly below, or under, a middle horizontal plane of the reflector, displaced from a side of a middle vertical plane of the reflector facing away from oncoming traffic (not shown).

Figure 1:
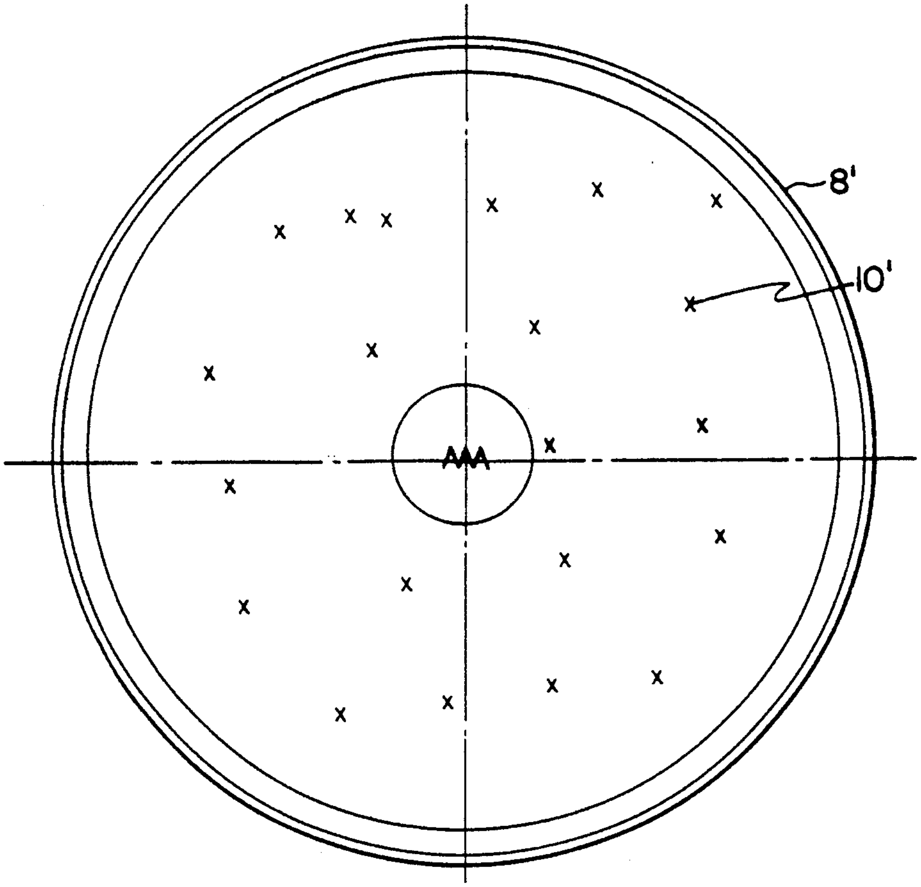
FIG. 1 PRIOR ART
FIG. 1 is a front view of a reflector of a prior art headlight with X's thereon graphically indicating light reflective positions.
Figure 4:
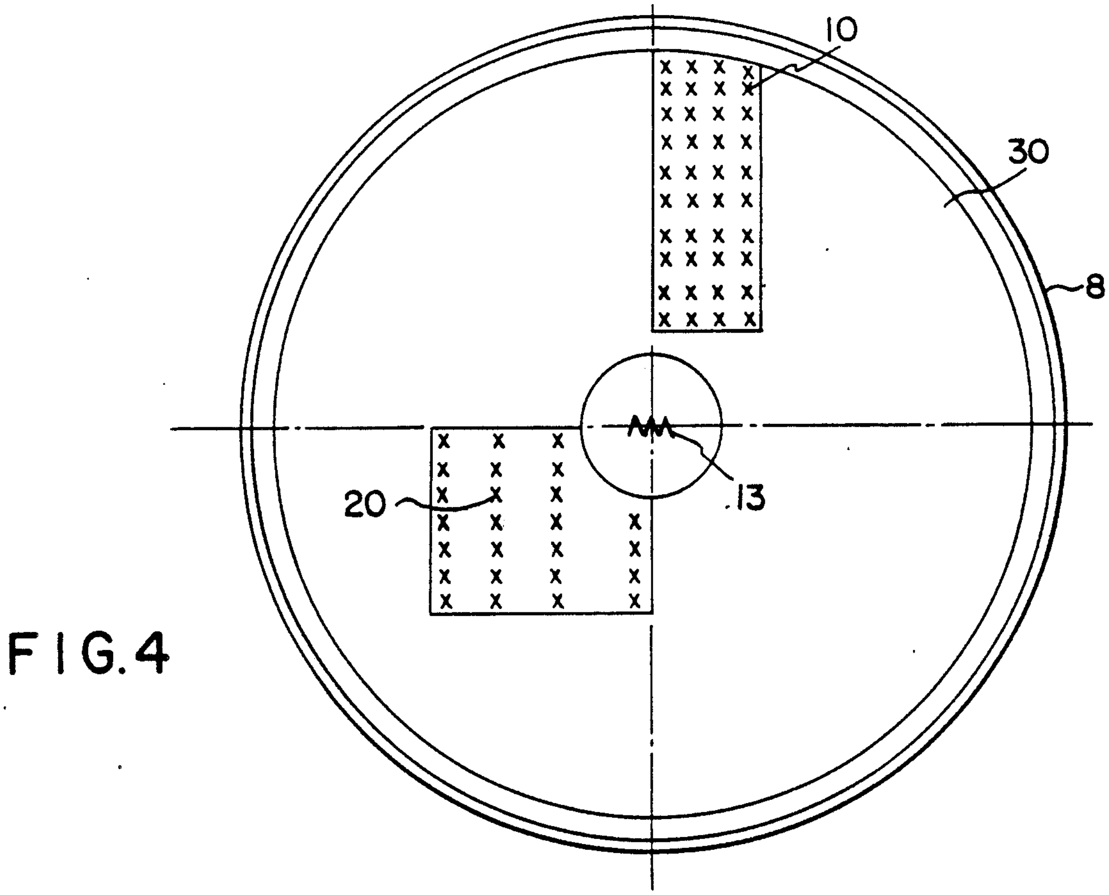
FIG. 4 is a front view of the headlight of FIG. 3 with the light-transmissive shield removed and areas located at upper and lower zones of the light-transmissive shield having crosses thereon graphically indicating light reflective positions.
Figure 2:
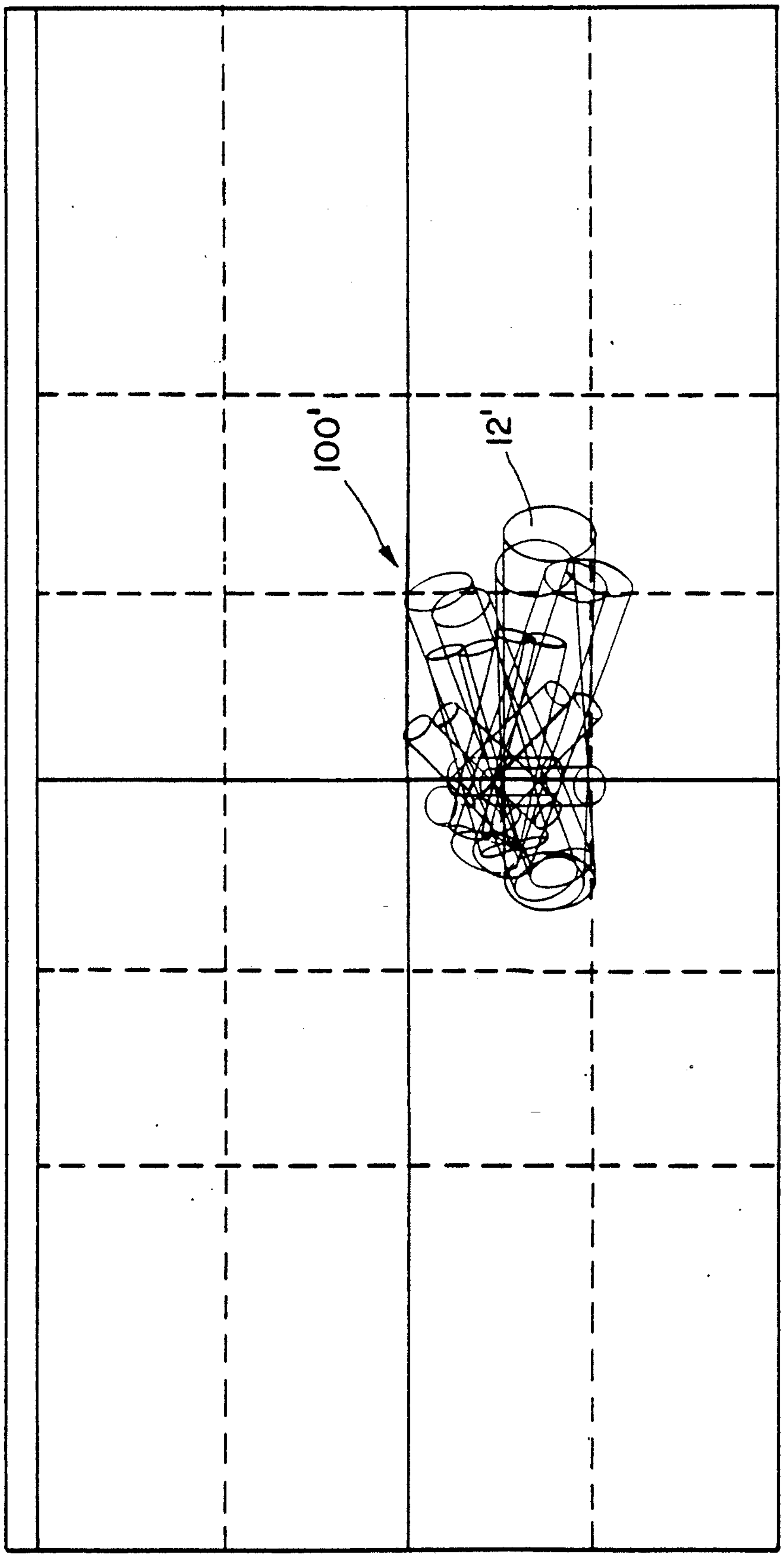
FIG. 2 is a graphical representation of filament images of the headlight of FIG. 1 on a wall in front of the headlight.
Figure 3:
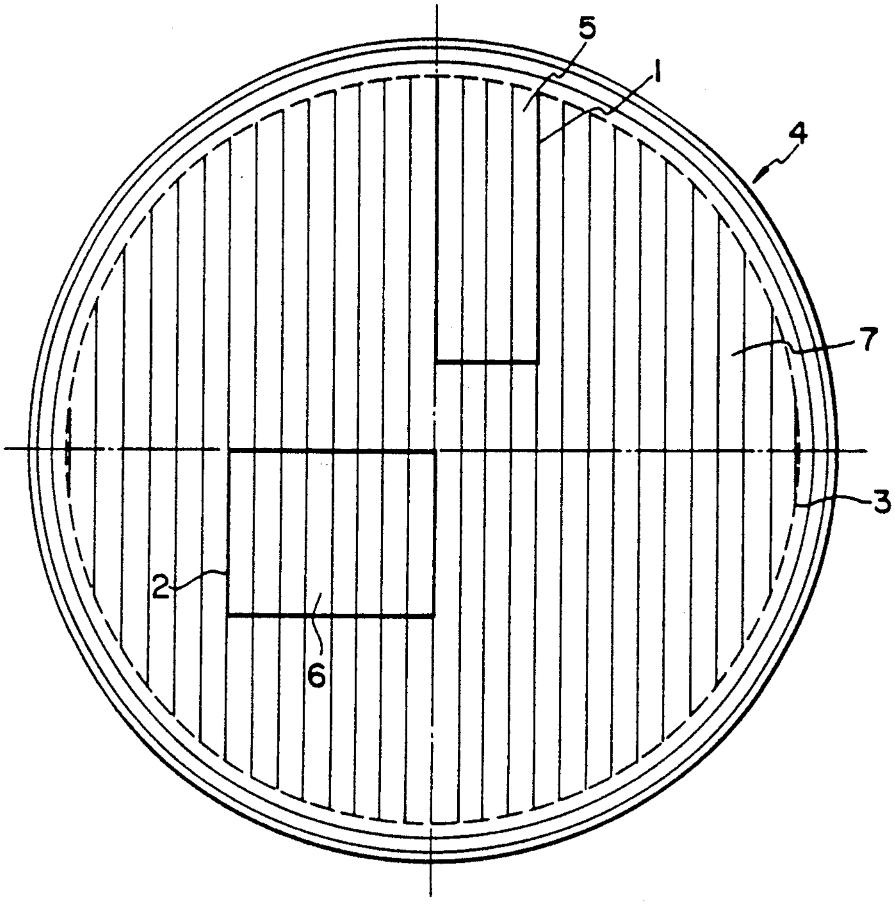
FIG. 3 is a front view of a headlight of this invention including a light transmissive shield thereon.
Figure 7:
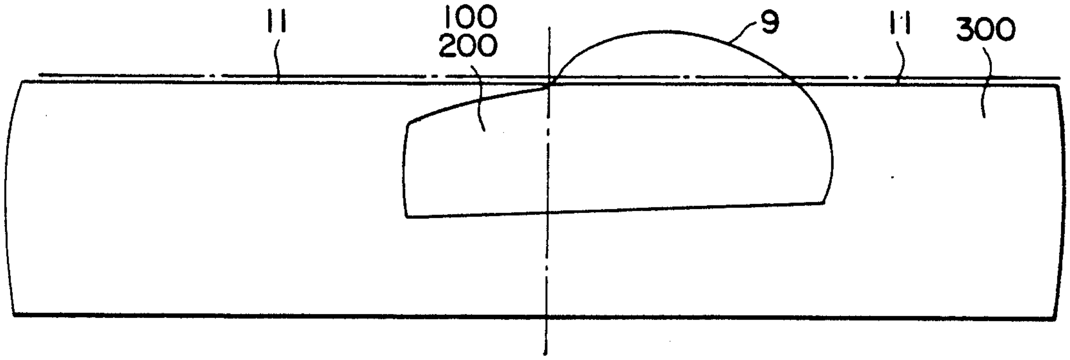
FIG. 7 is a composite plot of the light figure of the headlight of FIG. 3.
Figure 5:
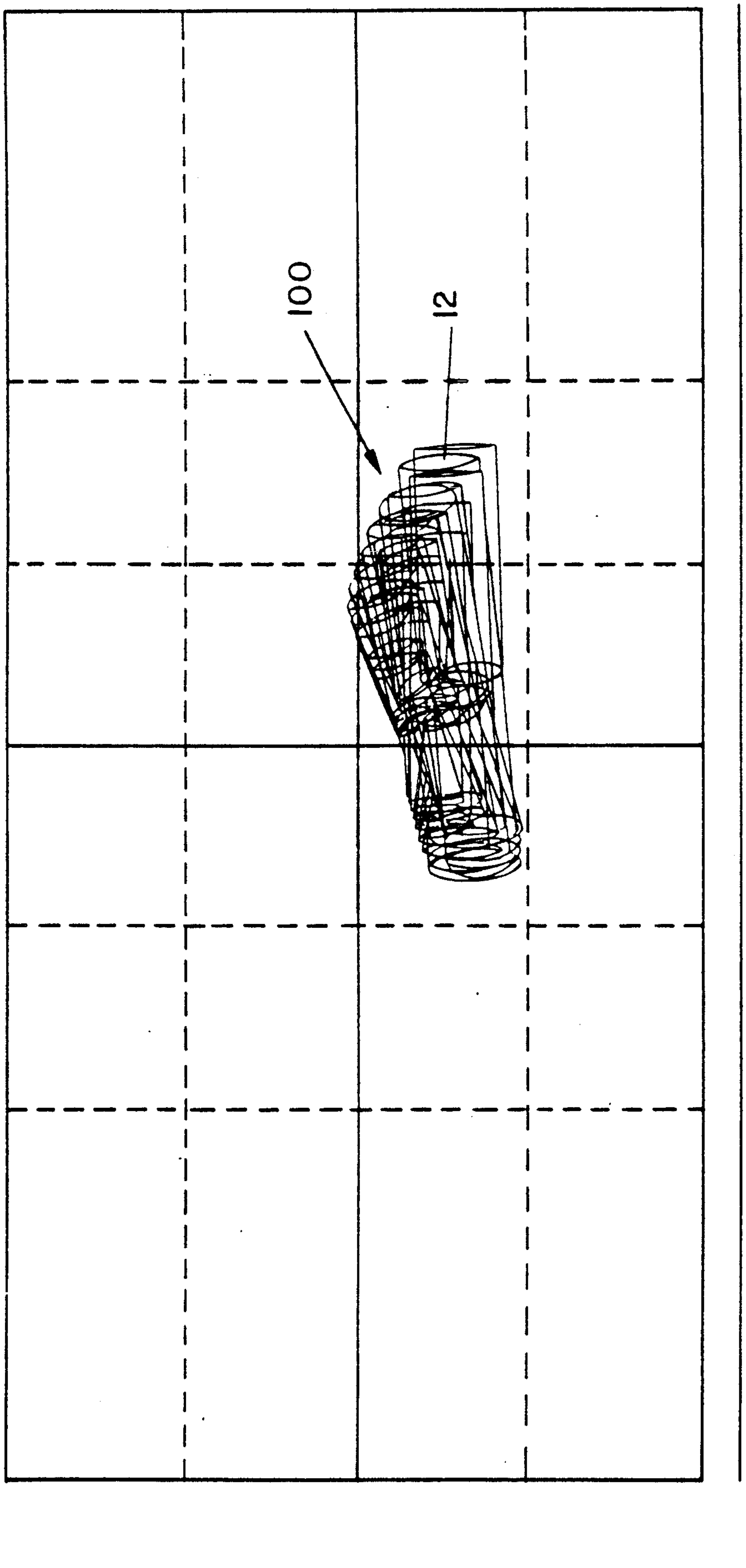
FIG. 5 is a plot, or graph, of filament images forming a partial area of a light figure on a vertical wall in front of the headlight of FIG. 3.
Figure 6:
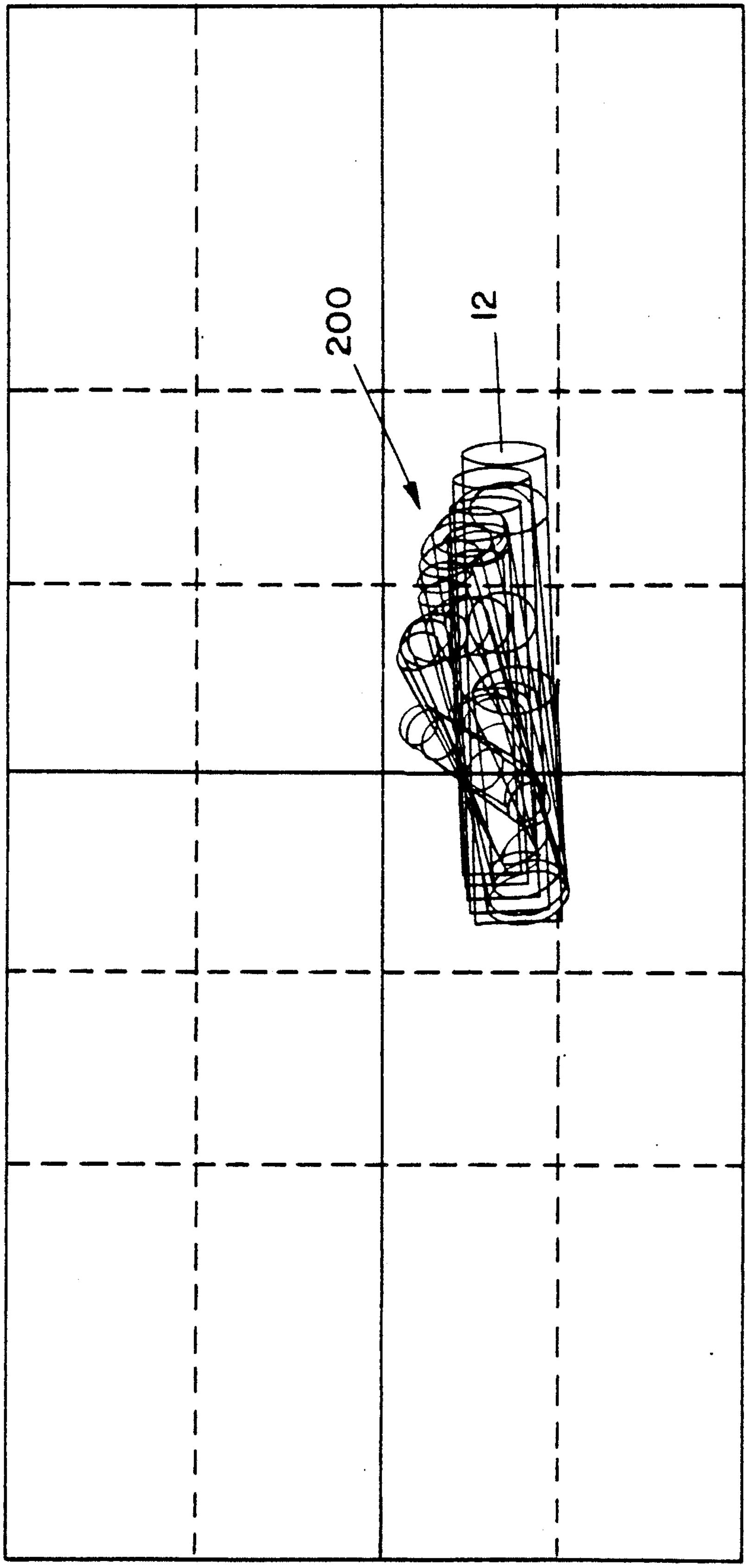
FIG. 6 is a plot of light images forming a partial area of the light figure on a vertical wall in front of the headlight of FIG. 3.

The light-transmissive shield 4 is circular and its backside is occupied by optical devices 5, 6 and 7. The optical devices 5 and 6 are arranged as rectangularly shaped surface zones 1 and 2 of the light-transmissive shield 4, and are vertically running, strip-formed, prisms. The rest, or remaining area, 3 of the light-transmissive shield 4 includes optical devices 7 which are vertically running cylindrical lenses 7. The cylindrical lenses 7 are approximately as wide as the strip-formed prisms and are aligned with the strip formed prisms above and below the rectangularly shaped surface zones 1 and 2. The rectangularly shaped zone 1 is above a horizontal middle plane of the reflector while the rectangularly shaped surface zone 2 is arranged below this middle plane. Both surface zones are bordered on one side by the vertical middle plane. The upper surface zone 1 extends toward an oncoming traffic side while the surface zone 2 extends toward the other side and is bordered at an upper edge by the horizontal middle plane. The lower edge of the upper surface zone 1 is spaced from the vertical middle plane of the reflector while its upper edge extends to an upper rim, or edge, of the light-transmissive shield 4. The reflection surface of the reflector 8 is shown in FIG. 4. An upper rectangularly-shaped surface area is represented by crosses 10 and a lower square surface area is represented by the crosses 20. The remaining surface area of the reflection surface is designated by reference numeral 30. Those light beams reflected at crosses 10 and 20 respectively produce the partial areas 100 and 200 of a headlight-reflected light bundle. The light bundles producing the partial areas 100 and 200 are each respectively diverted and/or rotated by strip formed prism-like optical devices 5 and 6 at an angle of a size such that the partial areas 100 and 200 overlap in an area of their greatest light intensity and their composite bright-dark border 9 for a driving lane of a motor vehicle on which the headlight is mounted lies at a higher level than a bright-dark border 11 of a partial area 300 of the light figure for an oncoming-traffic side and rim areas of the motor vehicle's driving lane. The lighted area 300 is produced by light beams which are reflected from the reflection surface 30 of the reflector 8 and are diverted in a horizontal direction through the cylindrical lenses 7 of the remaining area 3 of the light-transmissive shield 4. As can be recognized from the filament images shown in FIGS. 5 and 6, the filament images extending along their length in a horizontal direction are quite large. In this manner, the partial area 100 and 200 of the light figure extends into the oncoming traffic lane side. Further, it can be recognized that the larger an angle is between the horizontal plane and length axes of the filament images, the smaller the filament images are. The smaller filament images lie in a middle upper reach of the partial area 100 and 200. In this manner, a good distance illumination of a driver's lane is produced.

An object of this invention is provided by the limitations in the improvement paragraph of claim 1.

In such a headlight, a high level area of a light figure is produced in a driving lane through the overlapping of two light bundles without the necessity of a dispersion of light beams through cylindrical lenses. Further, the filament images of the previously described partial light areas are arranged relative to one another so that they produce a very sharp bright-dark border.

Further advantages of the invention are set forth in dependent claims 2 through 15. With the limitations of claim 2, a quite uniform light distribution in both far and near areas in front of a motor vehicle is achieved. With the limitations of claim 3, one gets two uncomplicatedly-formed surface zones of the light-transmissive shield. In this manner, such a light-transmissive shield is quite easy to produce and its optical devices can be quite simply calculated, or determined. With the effect that is achieved by the limitations of claim 4, the reach or range of a light bundle exiting the headlight is quite large. The range of the light bundle increases with an increase in the width of the upper rectangularly shaped surface zone. With further development of the headlight in accordance with claims 5 through 11, particularly beneficial position and size of the surface zones occupied by prism-like optical devices is given. With the headlight according to claims 1 through 16, one gets a light-transmissive shield which, because of the shapes of the prism-like optical devices in the upper and lower rectangularly shaped surface zones and of the cylindrically shaped optical devices in the remaining area of the light-transmissive shield as seen from the front, is occupied by uniformly extending optical devices. With the limitations of claim 17, a higher light intensity is achieved in nearer areas in front of the motor vehicle.

While the invention has been particularly shown and described with reference to a preferred embodiment, it will be understood by those skilled in the art that various changes in form and detail may be made therein without departing from the spirit and scope of the invention. For example, in one embodiment, the focus length of the reflector is 20 to 35 mm and a spacing of the upper zone from the horizontal plane is from 15 to 25 mm. In one embodiment, the upper zone is approximately twice as high as it is wide whereas the lower zone is approximately square. In one embodiment, the lower zone is from 35 to 45 mm high and from 40 to 60 mm wide. In one embodiment, the radii of the cylindrical lenses are to some extend of different sizes. In this regard, in a remaining area of the light-transmissive shield lying between the lower zone and an adjacent edge of the light-transmissive shield radii of cylindrical lenses are greater than are those of the cylindrical lenses in other areas of the light shield.

The embodiments of the invention in which an exclusive property or privilege are claimed or defined are as follows:

1. In a dimmable headlight for a motor vehicle having a parabolic shaped reflector and an incandescent bulb having an elongated glow filament for dimmed light which, in a mounted position of the headlight, extends approximately horizontal along its length axis approximately square to an optical axes of the headlight approximately at a focus point of the reflector, so that light bundled by the reflector causes a light figure on a vertical wall placed in front of the reflector which, at least a central portion thereof, is positioned below a horizontal middle plane of the reflector and is displaced from a side of a vertical plane of the reflector facing away from oncoming traffic, said headlight further having a light-transmissive shield covering a light reflecting surface of the reflector whose optical characteristics are such that it diverts light reflected from the reflector to produce a light figure having a bright-dark border which, in an area of a driving lane for the motor vehicle, is at a higher level than in an area of an oncoming traffic lane, the improvement wherein:

the light-transmissive shield has upper and lower prism-like zones with generally rectangular shapes, the upper zone lying substantially above and the lower zone lying substantially below the horizontal middle plane of the reflector with both zones being approximately bordered by the vertical middle plane, the upper zone extending from the vertical middle plane toward oncoming traffic while the lower zone extends toward the other side with its upper edge being approximately bordered by the horizontal middle plane of the reflector, the upper and lower zones each respectively including optical means for directing light beams passing through these zones onto a partial area of the light figure which extends to a higher level than that portion of the bright-dark border caused by light passing through the remainder of said light transmissive shield.

2. In a headlight as in claim 1 wherein the partial area of the light figure extends into a side of the middle vertical axis facing oncoming traffic.

3. In a headlight as in claim 1 wherein the prism-like optical means of the upper and lower zones of the light-transmissive shield have the further function of diverting light beams passing through the respective zones from particular reflection areas of the reflector approximately the same angle.

4. In a headlight as in claim 3 wherein the prism angle of the upper and lower zones each is of a size such that respective partial figures caused by light beams passing therethrough overlap at an area of greatest light intensity in said partial area.

5. In a headlight as in claim 1 wherein a lower edge of the upper zone of the light-transmissive shield is spaced from the horizontal middle plane of the reflector.

6. In a headlight as in claim 5 wherein when a focus distance of the reflector is 20 to 35 mm the space is 15 to 25 mm.

7. In a headlight as in claim 1 wherein the upper zone has an approximate shape of a vertically elongated rectangle.

8. In a headlight as in claim 1 wherein the upper zone extends approximately to an upper edge of the light-transmissive shield.

9. In a headlight as in claim 1 wherein the upper zone is approximately twice as high as it is wide.

10. In a headlight as in claim 1 wherein the lower zone is approximately square.

11. In a headlight as in claim 10 wherein the lower zone is from 35 to 45 mm high and from 40 to 60 mm wide.

12. In a headlight as in claim 1 wherein the optical means of the upper and lower zones comprise prism-like vertical strips.

13. In a headlight as in claim 1 wherein the light-transmissive shield outside of the upper and lower approximately rectangular zones comprises mainly vertically extending cylindrical lenses.

14. In a headlight as in claim 13 wherein the cylindrical lenses are approximately as wide as the prism-like vertical strips.

15. In a headlight as in claim 14 wherein the cylindrical lenses are aligned with the prism-like vertical strips above and below the rectangular zones.

16. In a headlight as in claim 13 wherein the radii of the cylindrical lenses are to some extent of different sizes.

17. In a headlight as in claim 16 wherein in an area of the light-transmissive shield lying between the lower zone and an adjacent edge of the light-transmissive shield, radii of cylindrical lenses are larger than are those of the cylindrical lenses in other areas of the light shield.

* * * * *